US009080533B2

(12) United States Patent
Fiolek et al.

(10) Patent No.: US 9,080,533 B2
(45) Date of Patent: Jul. 14, 2015

(54) FASTENER FITTING BETWEEN THE MOVABLE PORTION OF A DEPLOYABLE DIVERGING BELL FOR A THRUSTER AND A MECHANISM FOR DEPLOYING SAID MOVABLE PORTION

(75) Inventors: Michel Fiolek, Conches en Ouche (FR); Romain Stephant, Vernon (FR); Claude Pomies, Magnanville (FR); Noël David, Breuilpont (FR)

(73) Assignee: SNECMA, Paris (FR)

( * ) Notice: Subject to any disclaimer, the term of this patent is extended or adjusted under 35 U.S.C. 154(b) by 708 days.

(21) Appl. No.: 13/321,940

(22) PCT Filed: May 7, 2010

(86) PCT No.: PCT/FR2010/050878
§ 371 (c)(1),
(2), (4) Date: Nov. 22, 2011

(87) PCT Pub. No.: WO2010/136691
PCT Pub. Date: Dec. 2, 2010

(65) Prior Publication Data
US 2012/0060467 A1 Mar. 15, 2012

(30) Foreign Application Priority Data
May 27, 2009 (FR) ...................................... 09 53485

(51) Int. Cl.
*F02K 1/00* (2006.01)
*F02K 9/97* (2006.01)
(52) U.S. Cl.
CPC ........... *F02K 9/976* (2013.01); *Y10T 403/4691* (2015.01)

(58) Field of Classification Search
CPC ............. F02K 9/00; F02K 1/00; F02K 1/008; F02K 1/06; F02K 1/09; F02K 1/52; F02K 9/97; F02K 9/976; F02K 1/10
USPC ............. 239/265.11, 265.19, 265.43; 60/232, 60/796, 797, 771
See application file for complete search history.

(56) References Cited

U.S. PATENT DOCUMENTS

| 3,526,365 A * | 9/1970 | Ursery et al. ............ 239/265.43 |
| 4,252,286 A * | 2/1981 | Moorehead ............... 244/110 B |
| 2005/0016179 A1 | 1/2005 | Roth et al. |
| 2009/0104003 A1 * | 4/2009 | Anderson et al. ............. 411/411 |
| 2010/0205930 A1 | 8/2010 | Conete et al. |

FOREIGN PATENT DOCUMENTS

| EP | 0 661 436 | 7/1995 |
| EP | 1 460 258 | 9/2004 |
| FR | 2 916 018 | 11/2008 |
| WO | WO 2007/022771 | 3/2007 |

* cited by examiner

*Primary Examiner* — Gerald L Sung
(74) *Attorney, Agent, or Firm* — Preti Flaherty Beliveau & Pachios LLP

(57) ABSTRACT

The fastener fitting (40) has a first fastener zone (42) for fastening to an element (24) of the deployment mechanism. This fastener fitting (40) has two longitudinal arms (46A, 46B) that extend substantially in parallel and in the same direction from the first fastener zone (42). The free ends of these arms that are remote from the first fastener zone are separate, with each arm being provided with a distinct fastener surface (48A, 48B), these respective fastener surfaces together forming the second fastener zone.

23 Claims, 5 Drawing Sheets

FASTENER FITTING BETWEEN THE MOVABLE PORTION OF A DEPLOYABLE DIVERGING BELL FOR A THRUSTER AND A MECHANISM FOR DEPLOYING SAID MOVABLE PORTION

TECHNICAL FIELD

The present invention relates to a fastener fitting between the movable portion of a deployable diverging bell of a thruster and a deployment mechanism for deploying said movable portion, the fastener fitting having a first fastener zone for fastening to an element of the deployment mechanism and a second fastener zone for fastening to the movable portion.

BACKGROUND

A deployable diverging bell is used in particular in a rocket engine of an upper stage (e.g. second or third stage). In such an application, it is necessary to deliver a very large amount of thrust, where the amount of thrust depends essentially on the rate at which gas is ejected and on the speed of ejection. In order to optimize those parameters, it is necessary to have a diverging bell that presents a very large expansion ratio, and thus a large outlet diameter. It is therefore necessary to have a diverging bell that is long, which is not compatible with the small amount of space available, in particular when the diverging bell is fitted to a thruster of the second or third stage of a rocket.

For applications of this type, a deployable diverging bell is therefore used, i.e. a bell that is capable of adopting a retracted position, thereby giving it a short length, and capable of being lengthened by deploying one or more movable portions, in order to adopt its utilization configuration.

FIG. 1 shows a prior art deployable diverging bell that comprises a first portion 10 of the diverging bell that is stationary and that is connected to a stationary support 12 of the thruster, and a second portion 14 of the diverging bell that is movable in a longitudinal travel direction X-X' that corresponds to the direction of the longitudinal axis of the diverging bell. FIG. 1 shows the diverging bell in its deployed, utilization configuration, the upstream edge 14A of the portion 14 being connected to the downstream edge 10A of the portion 10.

As stated above, the stationary portion 10 of the diverging bell is stationary relative to the support 12. The deployment mechanism for deploying the movable portion 14 in the example shown comprises a wormscrew 20 that has its end remote from the movable portion 14 of the diverging bell supported by arms 18 and 16 via a connection part 22, these arms projecting outwardly and being themselves fastened to the stationary support 12 at their ends remote from the wormscrew 20. The deployment mechanism also includes a nut 24 in which the wormscrew is engaged, the nut 24 being supported by a fastener fitting 26 fastened to the upstream edge 14A of the movable portion 14 of the diverging bell. In the example shown, three deployment mechanisms of this type are provided.

It can be understood that the fastener fitting 26 has a first fastener zone 26A to which the nut 24 forming part of the deployment mechanism is fastened, and a second fastener zone 26B that is fastened to the movable portion 14 of the diverging bell. Overall, the fitting 26 is stirrup-shaped, and its second fastener zone 26B is in the form of a transverse strip extending in the circumferential direction of the portion 14 of the diverging bell. In known manner, this fastening may be performed by adhesive and by screws. The "transverse strip" shape of the second fastener zone 26B stiffens the fastener zone between the fastener fitting 26 and the movable portion 14 of the diverging bell. This leads to difficulty insofar as the diverging bell, as a whole, is subjected to very high temperatures and to very high levels of vibration. In the fastener zone of each fitting 26, the second portion 14 of the diverging bell is thus stiffened on a portion of the periphery of its upstream edge corresponding to the length of the "strip" 26B, such that its response to the various stresses to which it is subjected is non-uniform around said upstream edge. In particular, it may tend to deform by ovalizing under the combined effect of high temperatures and vibration, while the fastener "strip" 26B does not follow the ovalization. This results in a risk of the fastener breaking, since the fastening means such as adhesive or screws are subjected to particularly high traction forces, and this also leads to risks of the movable portion 14 of the diverging bell being damaged.

BRIEF SUMMARY

The invention seeks to remedy those drawbacks by proposing a fastener fitting that is substantially free of the above-mentioned drawbacks.

This object is achieved by the fact that the fastener fitting has two longitudinal arms that extend substantially in parallel and in the same direction from the first fastener zone, having free ends remote from the first fastener zone that are separate, each arm being provided with a distinct fastener surface, the respective fastener surfaces together forming the second fastener zone.

It can be understood that the fastener fitting of the invention is generally U-shaped, with the ends of the branches of the U-shape constituting the ends of the arms of the fitting and being fastened to the moving portion of the diverging bell. Thus, the "second fastener zone" is constituted by the respective fasteners between each of the two arms of said fitting and the movable portion of the diverging bell. Because of the U-shape of this fitting, which does not have any connecting web between its arms in the region where these arms are fastened to the movable portion of the diverging bell, these two arms are free to deform independently of each other to some extent. These movements between the two arms enable them to follow the deformations of the upstream edge of the movable portion of the diverging bell, without subjecting the fastener to the above-mentioned high traction forces. The deformations of the upstream edge of the movable portion of the diverging bell can thus be much more uniform, and any risk of premature fatigue is reduced. Naturally, the free ends of the arms of the fastener fitting provide very localized fastener surfaces.

Advantageously, the free ends of the arms present respective fastener plates.

Each of these fastener plates is fastened against the upstream edge of the movable portion of the diverging bell, providing the front thereof with intimate contact while using only a limited area.

Advantageously, the fastener plates present holes for fastener elements such as screws.

Optionally, this fastening by elements such as screws may be assisted by adhesive or the like.

Advantageously, the fastener fitting is made of an alloy having refractory properties, such as an alloy based on titanium-molybdenum.

This is a material that the inventors have found presents excellent high temperature behavior that allows the fastener fitting to conserve its integrity at the very high temperatures at which the thruster operates.

The invention also provides a deployable diverging bell for a thruster, the bell comprising:
- a stationary first portion of the diverging bell that is suitable for being attached to a stationary support of the thruster;
- a second portion of the diverging bell that is movable in a travel direction between a retracted position and a deployed position, in which said second portion connects to the downstream end of the first portion of the diverging bell in order to extend it; and
- at least one deployment mechanism comprising a first element fastened to the second portion of the diverging bell via a fastener fitting, and a second element supported relative to the stationary support, said first and second elements co-operating together so that relative movement between them causes the second portion of the diverging bell to move.

BRIEF DESCRIPTION OF DRAWINGS

In this deployable diverging bell, the fastener fitting is constituted, in accordance with the invention, with the two arms of said fitting extending substantially parallel to the travel direction of the second portion of the diverging bell.

The invention can be better understood and its advantages appear better on reading the following detailed description of an embodiment described with reference to the accompanying drawings, in which.

DETAILED DESCRIPTION

Figure 1:
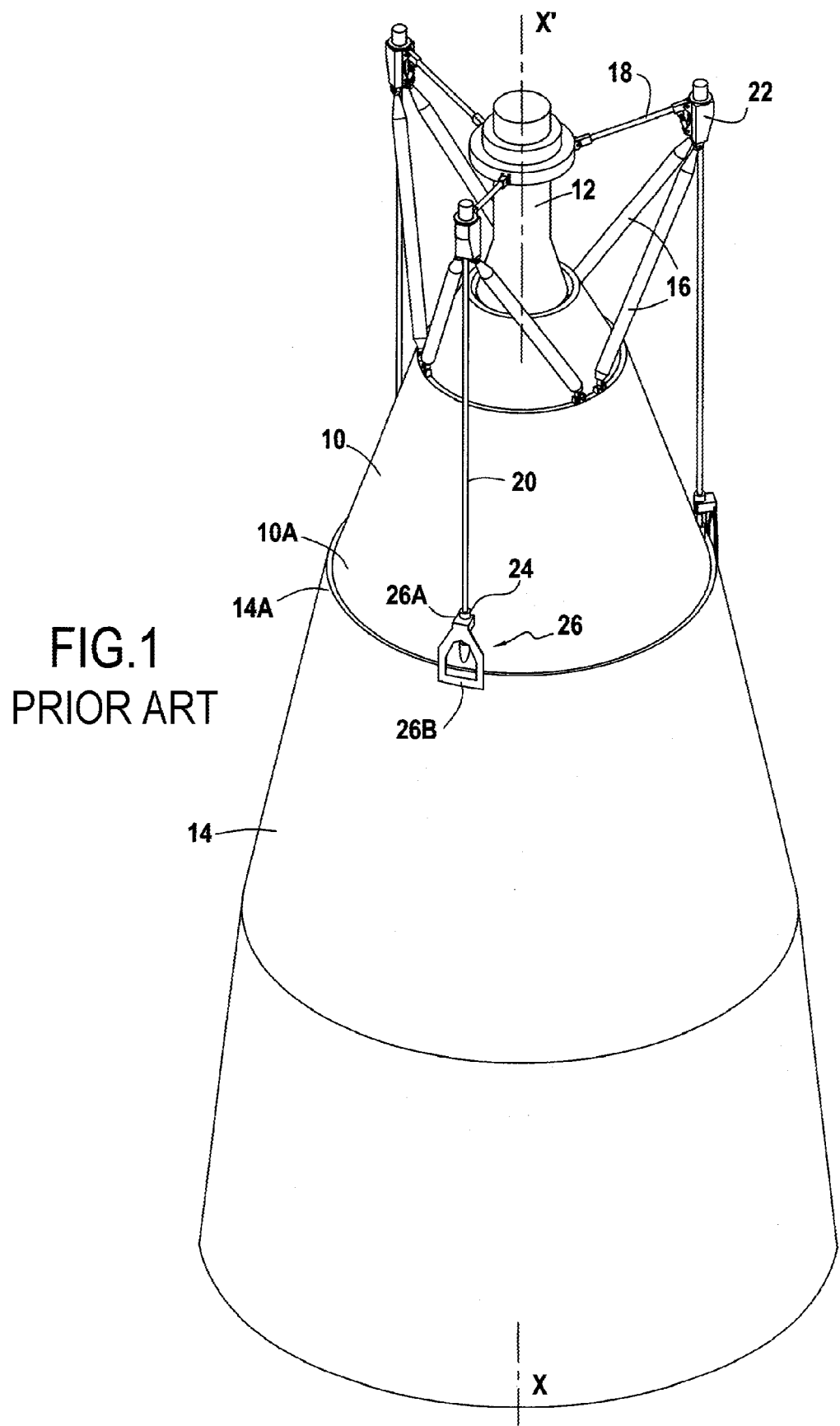
FIG. 1 shows a deployable diverging bell with prior art fastener fittings.
Figure 2:
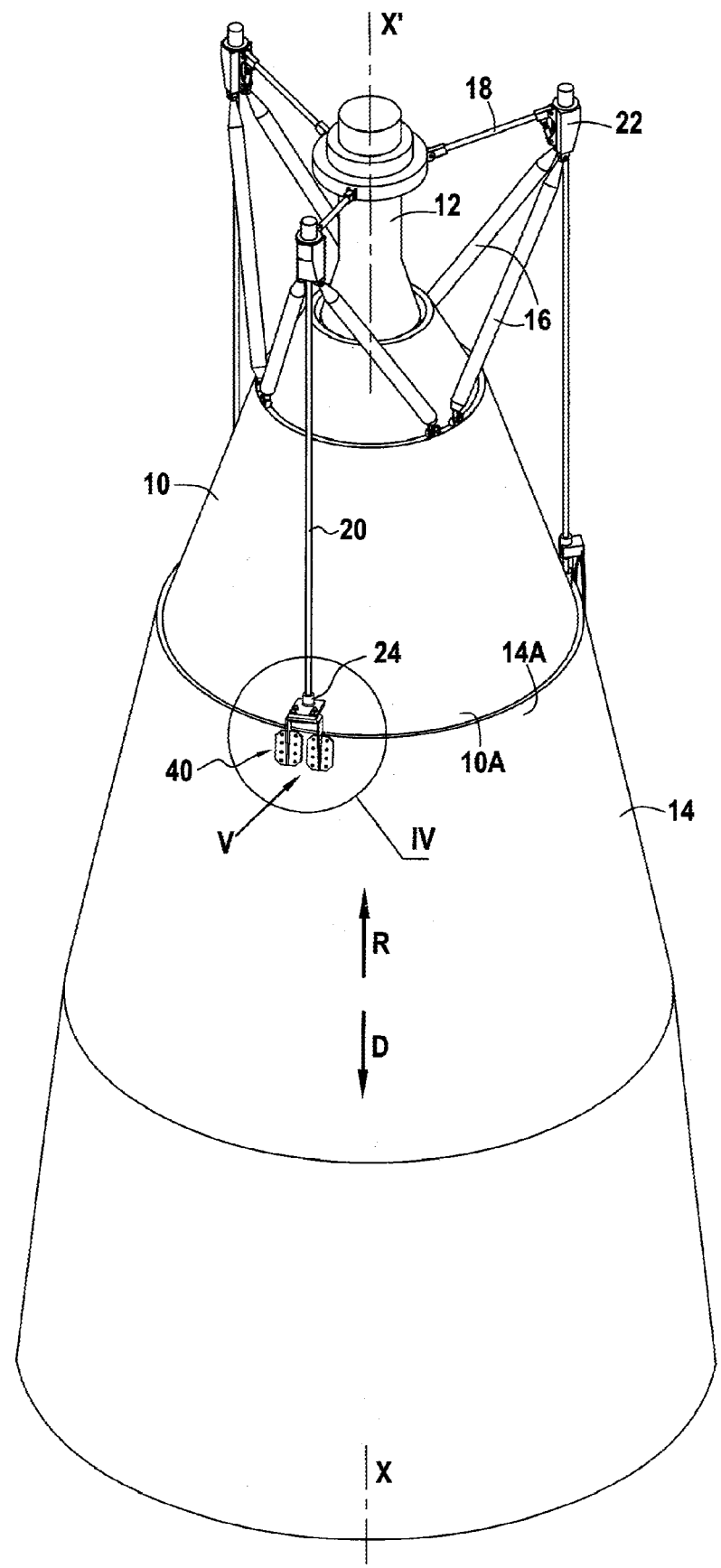
FIG. 2 shows a deployable diverging bell fitted with fastener fittings in an embodiment of the invention.
Figure 3:
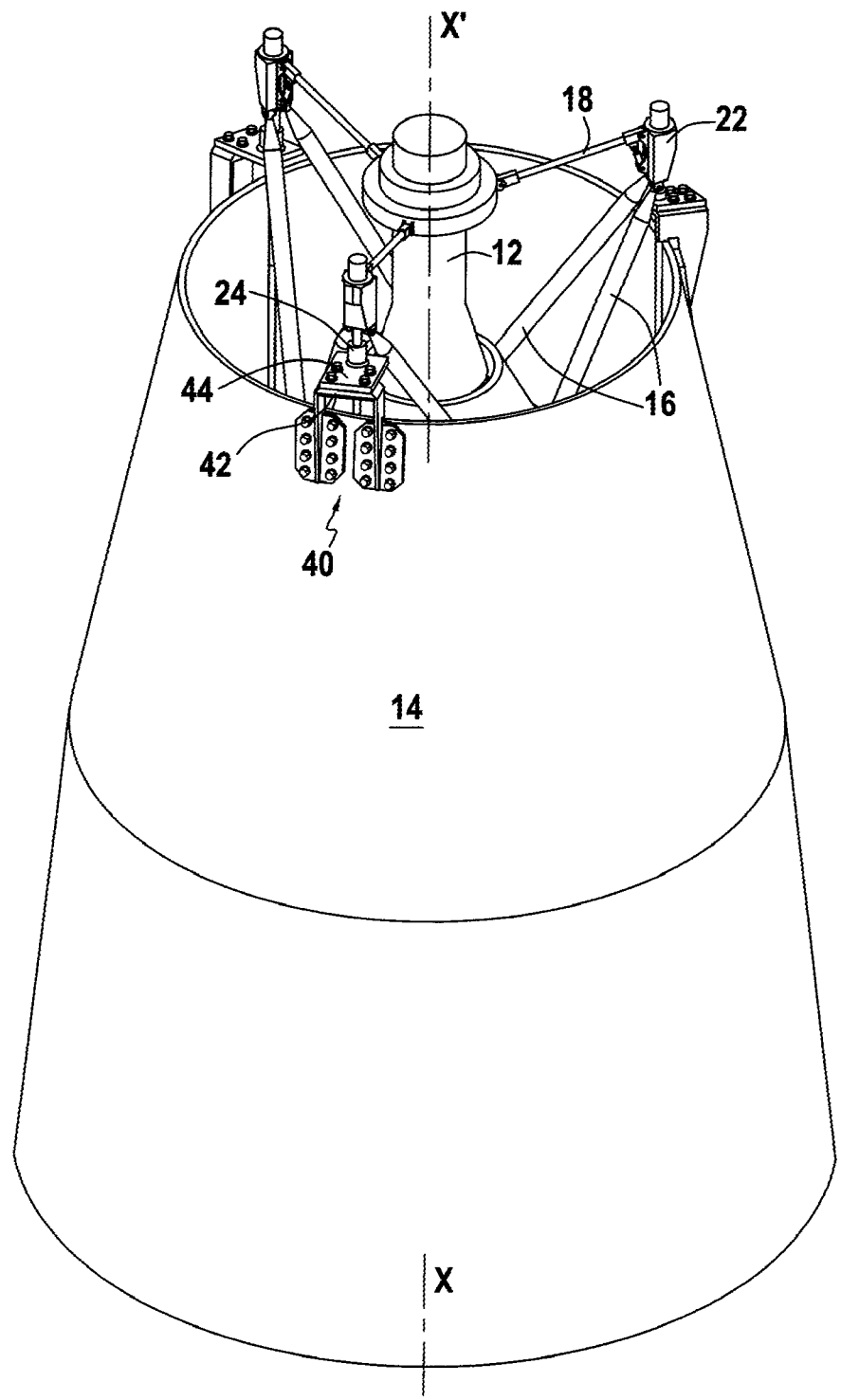
FIG. 3 is a view of the same diverging bell of FIG. 2, in the retracted position.

In FIGS. 2 and 3, the same numerical references are used as for FIG. 1 in order to describe elements that are unchanged relative to FIG. 1. In particular, there can be seen the two portions of the diverging bell, respectively the stationary portion 10 and the movable portion 14, the stationary support 12, and the arms 16, 18 connecting the connection parts 22 to the stationary support. There can be seen the wormscrews 20 connected to the connection parts 22, that are supported by the outwardly projecting arms 16 and 18. The wormscrews 20 co-operate with nuts 24 that are supported relative to the movable portion 14 of the diverging bell by fastener fittings 40.

In order to deploy the diverging bell, or indeed to retract it, the wormscrews 20 are rotated, and since the nuts 24 are stationary relative to the fastener fittings, this causes the portion 14 of the diverging bell to move in the direction R when the wormscrews are driven in the screw-tightening direction, or on the contrary causes said portion of the diverging bell to be deployed in the direction D when the wormscrews are driven to rotate in the screw-loosening direction. Specifically, each fastener fitting is associated with a deployment mechanism comprising a wormscrew 20 relative to the stationary portion of the diverging bell, and a nut 24 supported via a fastener fitting 40 by the movable portion 14 of the diverging bell.

With reference to FIGS. 2 to 6, it can be seen that the fastener fitting 40 of the invention comprises a first fastener zone 42 for fastening to an element of the deployment mechanism. Specifically, this element is the nut 24, and it is supported relative to the first fastener zone 42 of the fitting 40 by an interface plate 44.

It can also be seen that the fastener fitting 40 has two longitudinal arms, respectively referenced 46A and 46B, that extend substantially parallel to each other and in the same direction from the first fastener zone 42. In other words, the fitting 40 is generally U-shaped, the first fastener zone forming a bridge between its two longitudinal arms. It can be seen that the free ends 46'A and 46'B of these arms 46A and 46B that are remote from the first fastener zone 42 are themselves separate. This means that they constitute two ends that are indeed free and that are not connected together by an element that might prevent them from flexing a little relative to each other. In particular, it can be seen that there is no interconnecting web or the like between the two free ends of the arms 46A and 46B, with the arms being connected together only via their ends remote from their free ends by means of the portion 42 that forms the bridge of the U-shape.

It can be seen that the free ends 46'A and 46'B of the arms 46A and 46B carry respective fastener plates 48A and 48B.

These fastener plates present holes 50 (see FIGS. 5 and 6) for fastener elements such as screws 52.

Figure 4:
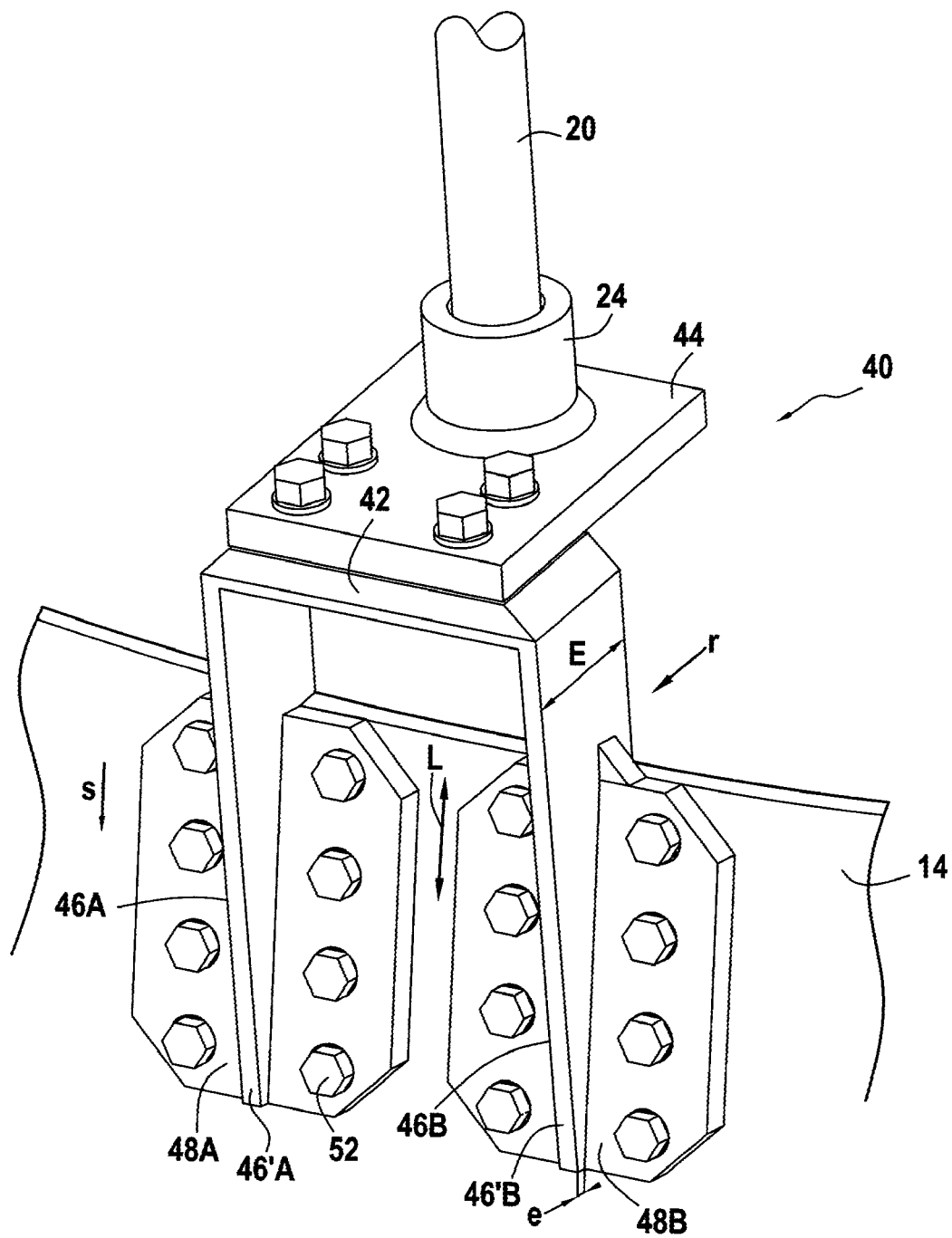
FIG. 4 is an enlarged view of zone IV in FIG. 2.
Figure 5:
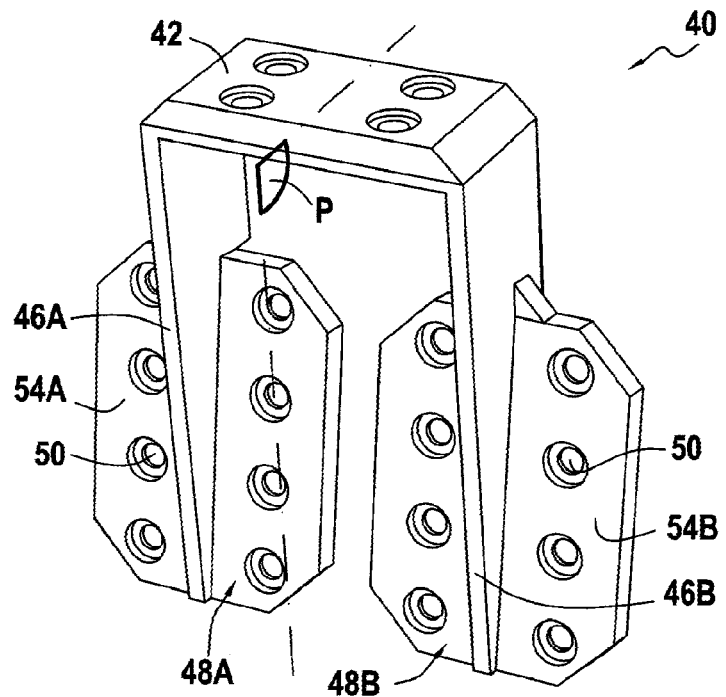
FIG. 5 is a perspective view of the fastener fitting shown in FIG. 2, as seen looking along arrow V in FIG. 2.
Figure 6:
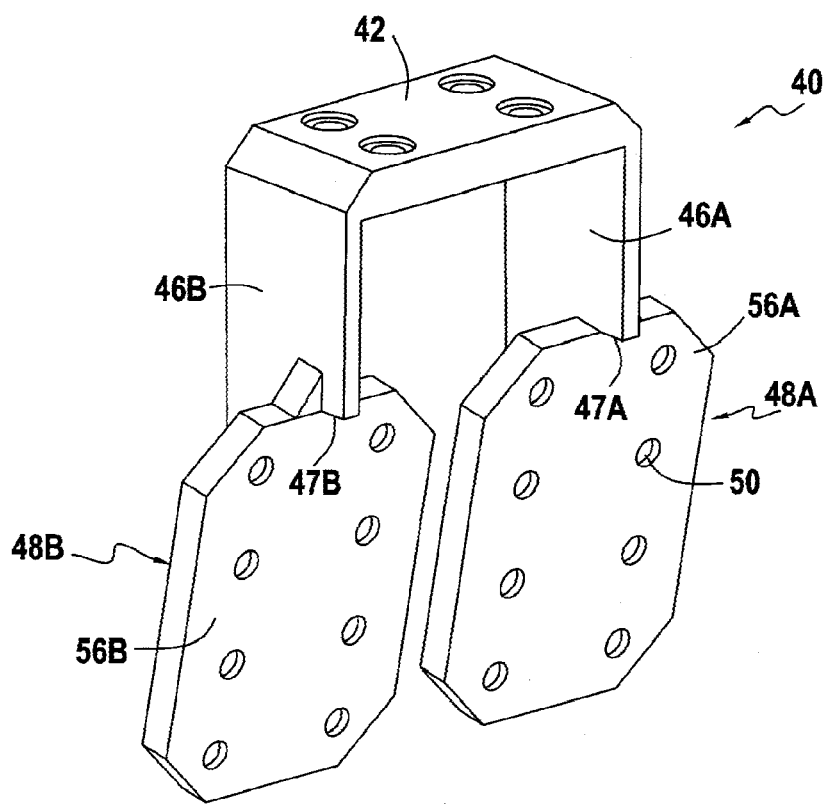
FIG. 6 is a perspective view of the same fastener fitting, as seen from the rear of FIG. 5.

Each plate presents a respective outer face 54A and 54B and a respective inner face 56A, 56B. The inner face is the face that faces towards the inside of the diverging bell when the plate is fastened on the second portion 14 thereof. The outer face is naturally the opposite face. In FIG. 6, it can be seen that the inner face of each plate is set back relative to the arm 46A or 46B that carries it. These setbacks 47A and 47B, respectively, form abutments that, as can be seen in FIG. 4, serve to set the longitudinal position of the fastener fitting 40 relative to the second portion 14 of the diverging bell, when said fitting is mounted on said second portion.

Furthermore, the inner faces 56A and 56B of the plates do not have any portions in relief so they can be pressed against the outside face of the second portion 14 of the diverging bell.

In contrast, on the outer face 54A, 54B of each plate, the corresponding arms 46A, 46B that carries the plate projects outwards. It can be seen, in particular in FIGS. 4 and 5, that the arms form ribs on the outer faces of the plates.

The arms act as stiffeners of sufficient mechanical strength. Nevertheless, it can be seen that the arms present thickness, as measured in the radial direction $\underline{r}$ perpendicular to the longitudinal direction L of the fastener fittings (which direction is parallel to the axis of the diverging bell) that tapers in the direction S going towards the free ends 46'A and 46'B. It can thus be observed that in the vicinity of the first fastener zone 42, the thickness E of an arm is much greater than the thickness $\underline{e}$ of the same arm at its free end, which thickness $\underline{e}$ is practically zero, such that the thickness of the arm coincides practically with the thickness of the plate that it is carrying.

Thus, the arms act as stiffeners that present a stiffening effect that decreases going towards their free ends. As a result, the plates 48A and 48B are simultaneously well supported relative to the portion 42 of the fastener fitting, but they are capable of moving a little, in particular in the radial direction $\underline{r}$ so as to allow the fastener surfaces of the plates to accompany any deformation of the movable portion 14 of the diverging bell, in particular in the radial direction $\underline{r}$.

The fastener fitting 40 is symmetrical about a radial plane P passing via the middle cross-section of the first fastener zone 42. This plane is defined by the middle transverse segment of the zone 42 and the longitudinal direction of the fastener fitting.

It can also be seen that each of the plates 48A and 48B extends on either side of the rib formed by the corresponding arm 46A or 46B, and that each plate presents holes 50 for receiving respective screws in both of its halves, i.e. situated on both sides of the corresponding rib. Thus, each arm is thoroughly secured to the second portion 14 of the diverging bell, without any risk of separating therefrom.

In general, it is advantageous, for each arm, that the plate secured to said arm extends on either side of the rib formed by the arm. It is even desirable for the plate to be capable of being secured to the second portion of the diverging bell by fastener elements that extend on either side of the said rib. In the example shown, each of the holes 50 situated on one side of the rib corresponds to another hole situated in the same plane that extends perpendicularly to the longitudinal direction of the plate. It is also possible to make provision for the holes to be arranged otherwise, e.g. in a staggered configuration.

In the example shown, the deployable diverging bell of FIGS. 2 and 3 has three drive mechanisms, i.e. three assemblies, each of a wormscrew 20 and a nut 24, each assembly being associated with a fastener fitting. These mechanisms are regularly distributed angularly, forming angles of 120° between one another. Naturally, some other number of mechanisms could be provided, for example four mechanisms, and preferably likewise regularly distributed.

What is claimed is:

1. A fastener fitting between a movable portion of a deployable diverging bell of a thruster and a deployment mechanism for deploying said movable portion, the fastener fitting having a first fastener zone for fastening to an element of the deployment mechanism, and two longitudinal arms that extend substantially in parallel and in the same direction from the first fastener zone, said arms having free ends remote from the first fastener zone that are separate, each arm being provided with a distinct fastener surface, the respective fastener surfaces together forming a second fastener zone for fastening to the movable portion,
wherein the arms form ribs and a thickness of the arms tapers in a direction going towards the free ends.

2. The fastener fitting according to claim 1, wherein the free ends of the arms are provided with respective fastener plates.

3. The fastener fitting according to claim 2, wherein the fastener plates present holes for fastener elements.

4. The fastener fitting according to claim 2, wherein each plate presents an outer face from which the arm carrying the plate projects, and an inner face having no portion in relief.

5. The fastener fitting according to claim 4, wherein the inner face of the plate is set back relative to the arm carrying said plate.

6. The fastener fitting according to claim 1, wherein, for each arm, a plate extends on each side of the rib formed by the arm.

7. The fastener fitting according to claim 1, made of an alloy having refractory properties.

8. The fastener fitting according to claim 7, wherein the alloy is based on titanium-molybdenum.

9. The fastener fitting according to claim 2, wherein each plate presents an outer face from which the arm carrying the plate projects, and an inner face having no portion in relief and wherein the fastener plates present holes for fastener elements.

10. The fastener fitting according to claim 9, wherein the inner face of the plate is set back relative to the arm carrying said plate.

11. A deployable diverging bell for a thruster, the bell comprising:
a stationary first portion of the diverging bell that is suitable for being attached to a stationary support of the thruster;
a second portion of the diverging bell that is movable in a travel direction between a retracted position and a deployed position, in which said second portion connects to a downstream end of the first portion of the diverging bell in order to extend said first portion; and
at least one deployment mechanism comprising at least one nut fastened to the second portion of the diverging bell via a fastener fitting, and at least one wormscrew supported relative to the stationary support, said at least one nut and at least one wormscrew co-operating together so that relative movement between said at least one nut and said at least one wormscrew causes the second portion of the diverging bell to move;
wherein the fastener fitting has a first fastener zone fastened to the at least one nut, and two longitudinal arms that extend substantially parallel to the travel direction of the second portion of the diverging bell and in the same direction, said arms having free ends remote from the first fastener zone; each arm being provided with a distinct fastener surface, said fastener surfaces being for fastening to the second portion of the diverging bell.

12. The deployable diverging bell according to claim 11, wherein the free ends of the arms are provided with respective fastener plates.

13. The deployable diverging bell according to claim 12, wherein each plate present an outer face from which the arm carrying the plate projects, and an inner face having no protruding relief.

14. The deployable diverging bell according to claim 13, wherein the inner face of each plate is set back relative to the arm carrying the plate.

15. The deployable diverging bell according to claim 12, wherein the free ends of the arms are provided with respective fastener plates, and said free ends of the arms form ribs on said plates.

16. The deployable diverging bell according to claim 11, wherein the arms form ribs.

17. The deployable diverging bell according to claim 11, wherein a thickness of the two longitudinal arms tapers in a direction going towards the free ends.

18. A deployable diverging bell for a thruster, the bell comprising:
a stationary first portion of the diverging bell that is suitable for being attached to a stationary support of the thruster;
a second portion of the diverging bell that is movable in a travel direction between a retracted position and a deployed position, in which said second portion connects to a downstream end of the first portion of the diverging bell in order to extend said first portion; and
at least one deployment mechanism comprising a first element fastened to the second portion of the diverging bell via a fastener fitting, and a second element supported relative to the stationary support, said first and second elements co-operating together so that relative movement between said first and second elements causes the second portion of the diverging bell to move;
wherein the fastener fitting has a first fastener zone for fastening to the first element, and two longitudinal arms that extend substantially parallel to the travel direction of the second portion of the diverging bell and in a same direction, said arms having free ends remote from the first fastener zone; each arm being provided with a distinct fastener plate, said fastener plate being fastened to the second portion of the diverging bell.

19. The deployable diverging bell according to claim 18, wherein the arms form ribs.

20. The fastener fitting according to claim 19, wherein a thickness of the arms tapers in a direction going towards the free ends.

21. The deployable diverging bell according to claim 18, wherein, for each arm, a plate extends on each side of a rib formed by the arm.

22. The deployable diverging bell according to claim 18, wherein a thickness of the arms tapers in a direction going towards the free ends.

23. The deployable diverging bell according to claim 18, wherein the free ends of the arms are provided with respective fastener plates.

* * * * *